(12) United States Patent
Manac'h

(10) Patent No.: US 8,743,440 B2
(45) Date of Patent: Jun. 3, 2014

(54) METHOD FOR CLASSIFYING A DOCUMENT TO BE ASSOCIATED WITH A SERVICE, AND ASSOCIATED SCANNER

(75) Inventor: Stéphane Manac'h, Rueil Malmaison (FR)

(73) Assignee: Sagemcom Documents SAS, Rueil Malmaison (FR)

( * ) Notice: Subject to any disclaimer, the term of this patent is extended or adjusted under 35 U.S.C. 154(b) by 216 days.

(21) Appl. No.: 13/511,361

(22) PCT Filed: Nov. 23, 2010

(86) PCT No.: PCT/EP2010/068060
§ 371 (c)(1),
(2), (4) Date: Aug. 1, 2012

(87) PCT Pub. No.: WO2011/061350
PCT Pub. Date: May 26, 2011

(65) Prior Publication Data
US 2012/0287489 A1   Nov. 15, 2012

(30) Foreign Application Priority Data
Nov. 23, 2009  (FR) ...................................... 09 58262

(51) Int. Cl.
H04N 1/46  (2006.01)
H04N 1/40  (2006.01)
H04N 1/00  (2006.01)
H04N 1/04  (2006.01)
G06K 9/00  (2006.01)
G06K 9/18  (2006.01)
G06K 9/46  (2006.01)

(52) U.S. Cl.
USPC ........... 358/530; 358/403; 358/443; 358/474; 382/181; 382/182; 382/190; 382/195

(58) Field of Classification Search
USPC ......... 358/403, 443, 449, 474, 530, 1.15, 1.9, 358/3.28; 235/382; 382/181, 182, 190, 195, 382/286; 715/234, 237
See application file for complete search history.

(56) References Cited

U.S. PATENT DOCUMENTS 6,970,870 B2 * 11/2005 Dweck et al. .......................... 1/1
7,948,664 B2 * 5/2011 Morimoto et al. ............ 358/474

(Continued)

OTHER PUBLICATIONS

Mullot, R., "Les documents ecrits", Jan. 1, 2006, Lavoisier, XP002590148, pp. 192-193 and 208-216.

(Continued)

*Primary Examiner* — Charlotte M Baker
(74) *Attorney, Agent, or Firm* — Blakely Sokoloff Taylor & Zafman

(57) ABSTRACT

A method for classifying a document (3) to be associated with at least one service (Si), including a step in which a scanner (1) having a processor (6) scans (E1) the document (3). The method also includes steps in which the processor (6): develops (E2) at least one structure (Σj) representing the document (3), determines (E3) for each service (Si) at least one similitude value (σij) between the structure (Σj) representing the document and a reference structure (Rij) of the same kind and representing the service (Si), deduces (E4) from the similitude value (σij) the service (Si) with which the document (3) is to be associated, and processes (E5) the document (3) according to the service (Si) thus associated. The invention also relates to a scanner for implementing the method.

16 Claims, 3 Drawing Sheets

(56) References Cited

U.S. PATENT DOCUMENTS

Figure 1:
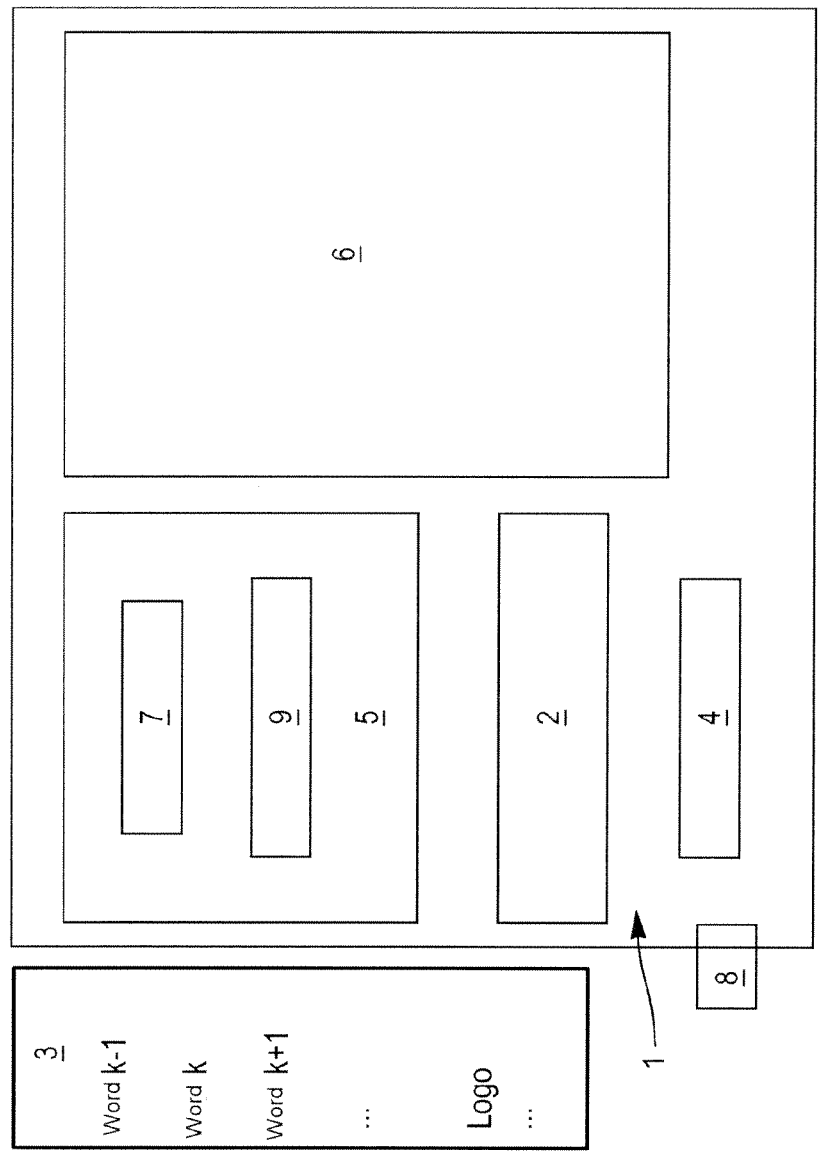

| | | | |
|---|---|---|---|
| 8,078,961 B2* | 12/2011 | Vion-Dury et al. | 715/237 |
| 8,462,394 B2* | 6/2013 | Fan et al. | 358/449 |
| 2002/0037097 A1 | 3/2002 | Hoyos et al. | |
| 2002/0075514 A1 | 6/2002 | Wright et al. | |
| 2002/0145746 A1 | 10/2002 | Mortenson et al. | |
| 2004/0103367 A1 | 5/2004 | Riss et al. | |
| 2006/0095830 A1 | 5/2006 | Krishna et al. | |
| 2006/0190489 A1 | 8/2006 | Vohariwatt et al. | |
| 2006/0230004 A1 | 10/2006 | Handley | |
| 2006/0282442 A1 | 12/2006 | Lennon et al. | |
| 2007/0237427 A1 | 10/2007 | Patel et al. | |

OTHER PUBLICATIONS

Chevallier, S., "Reconnaissance d'ecriture manuscrite par des techniques markoviennes; une approche bidimensionelle et generique," Universite Renes Descartes—Paris 5, Dec. 3, 2004, XP002614798, p. 86, para. 2, fig. 4.29, table 4.9.

Solan, L., "The and/or Rule," *The Language of Judges*, Univ. of Chicago Press, Jan. 1, 1993, XP008121481, pp. 45-54.

Spring, M.B., "Electronic Printing and Publishing," Jan. 1, 1991, XP8123965, pp. 57-82.

Nagy, G., et al., "Adaptive and Interactive Approaches to Document Analysis," *Studies in Computational Intelligence*, vol. 90, Jan. 1, 2008, XP008123274, pp. 221-257.

Chen., N., et al., "A survey of document image classification: problem statement, classifier architecture and performance evaluation," *International Journal of Document Analysis and Recognition(IJDAR)*, Springer, Berlin, Germany, Aug. 3, 2006, XP019493675, pp. 1-16.

Esposito, F., et al., "Machine Learning for Digital Document Processing: from Layout Analysis to Metadata Extraction," *Machine Learning in Document Analysis and Recognition*, vol. 90, Jan. 1, 2008, XP008123268, pp. 105-138.

Jaeger, S., et al., "Combining Classifiers with Informational Confidence," *Studies in Computational Intelligence*, vol. 90, Jan. 1, 2008, XP008123272, pp. 163-191.

Van Der Heijden. F., et al., Classification, Parameter Estimation and State Estimation, Jan. 1, 2004, Wiley, XP002615030, p. 177.

Maderlechner, G., et al., "Classification of Documents by Form and Content," *Pattern Recognition Letters*, vol. 18, No. 11-13, Elsevier, Amsterdam, Netherlands, Nov. 1, 1997, XP004117922, pp. 1225-1231.

Bruckner, T., et al., "In-House Mail Distribution by Automatic Address and Content Interpretation," *Proceedings / Fifth Annual Symposium on Document Analysis and Information Retrieval*: Apr. 15-17, 1996, Las Vegas, USA, XP008123931, pp. 67-75.

Krishna, V., et al., "Towards Smarter Documents," ACM, New York, USA, Jan. 1, 2004, XP040012097, pp. 634-641.

Hu, J., et al., "Document Image Layout Comparison and Classification," *Document Analysis and Recognition*, Bangalore, India, Sep. 20, 1999, XP010351198, pp. 285-288.

Ranlachandran, D., et al. "Towards Scaleable and Adaptive Document Routing Services," *IEEE International Conference on Services Computing*, Sep. 1, 2006, XP03027308, pp. 311-314.

Li, X., et al., "A Document Classification and Extraction System with Learning Ability," *Document Analysis and Recognition*, Bangalore, India, Sep. 20, 1999, XP010351275, pp. 197-200.

Bagdanov, A.D., et al., "Fine-grained Document Genre Classification Using First Order Random Graphs," *Document Analysis and Recognition*, Seattle, USA, Sep. 10, 2001, XP010560478, pp. 79-83.

Brun D'Arre, J.L., "Projet de dematerialisation des factures: pourquoi, comment?" URL: http://rfcomptable.grouperf.com/article/0319/ms/rfcompms0319_0001234.html?format=imprimer; Jul. 1, 2005, XP002614799, pp. 1-5.

"UCREL Semantic Analysis System (USAS)", URL:http://ucrel.lanes.ac.uk/usas/; Jan. 1, 2008, XP002614800, pp. 1-5.

* cited by examiner

METHOD FOR CLASSIFYING A DOCUMENT TO BE ASSOCIATED WITH A SERVICE, AND ASSOCIATED SCANNER

This is a non-provisional application claiming the benefit of International Application Number PCT/EP2010/068060 filed Nov. 23, 2010.

GENERAL TECHNICAL FIELD

The invention relates to a method for classifying a document to be associated with at least one service, comprising a step according to which a scanner including a processor scans the document.

The invention also relates to a scanner applying said method.

STATE OF THE ART

Complexification of economical and social activities has caused a spectacular increase in the number of stored and exchanged documents among various economic and social actors, whether these be companies, associations or individuals.

Thus, it is estimated that a company receives between 50 and 150 different kinds of documents (invoices, complaints . . . ), which in fine involves the processing of thousands of documents per year.

Most often, these documents are documents either received or sent in the form of paper.

In order to facilitate exchanges and processing of these documents, it is known how to proceed with scanning and digitizing of these documents in order to convert them into computer files and how to proceed with processing of said files in order to extract relevant information from them.

This is then referred to as dematerialization of documents.

Dematerialization may also be used in order to electronically handle data or documents which pass in transit within companies and/or within the scope of exchanges with partners (administrations, clients, suppliers, . . . ).

Most often, depending on the kind of document, it is necessary to carry out suitable processing for the document. For example, if these are invoices to be processed, the company may resort to a service operator, the role of which is to store and handle these invoices. It will resort to another operator for another type of document.

In practice, it is then necessary that an employee select a suitable dematerialization software package for this invoice and for the service operator, in order to extract the relevant information for said operator (number of the invoice, identification of the client, amounts, . . . ).

In this type of method, it is therefore necessary to train employees for processing the documents.

Further, it is necessary to install and configure powerful software packages within companies for processing these documents.

All of this increases the processing time and the cost of the processing operation.

Further, if the service operator desires different processing of the documents, he/she is forced to train the employees again and to apply new on-site parameterization of the dematerialization software packages.

This type of processing is therefore not very flexible and not very adapted to changes.

A method for classifying scanned documents, is known from Remy Mullot "Les documents ecrits" (written documents), including a semi-supervised learning step.

Also, a method for classifying scanned documents, including a learning step involving a human operator on the initiative of a machine carrying out the classification is known from George Nagy et al. "Adaptive and interactive approaches to document analysis".

The methods of the prior art generally consist of accomplishing preliminary learning, which involves a high commissioning cost, and low robustness to the time-dependent change in documents to be processed.

Continuous learning as described by Georges Nagy consists of achieving continuous identification of the significant patterns present in the documents to be recognized so as to improve the knowledge base. This assumes that this learning is achieved by an expert. This does not allow it to be achieved at the application level by the non-expert human user and is therefore not applicable to products intended for the market of the company during their current use.

In every case, the methods of the prior art consist of accomplishing preliminary learning, which involves a high commissioning cost and robustness to the time-dependent change in documents to be processed, which is low.

The methods of the prior art do not either fully benefit from the powerful analysis capabilities of automatic operators which have to process the documents.

PRESENTATION OF THE INVENTION

It is therefore necessary to propose an improvement in the processing of documents for overcoming these drawbacks.

For this purpose, a method according to claim 1 is proposed according to the invention.

The invention is advantageously completed by the characteristics of the dependent method claims, taken alone or in any of their technically possible combinations.

The invention also relates to a scanner applying said method.

The invention has many advantages.

One advantage of the invention is to propose an economical and flexible solution, the method and device for processing documents may be deployed and transparently updated for a user.

One other advantage of the invention is to propose an automatic and fast solution for processing documents.

One other further advantage of the invention is to propose a reliable solution for classifying documents.

The technique according to the invention, by means of the automatic learning step taking an instruction for either validating the classification by the scanner or not, gives the possibility of fully benefiting from the powerful analysis capabilities of automatic operators which have to process the documents, and which considerably reduce the risks of an error in the classification.

PRESENTATION OF THE FIGURES

Figure 2:
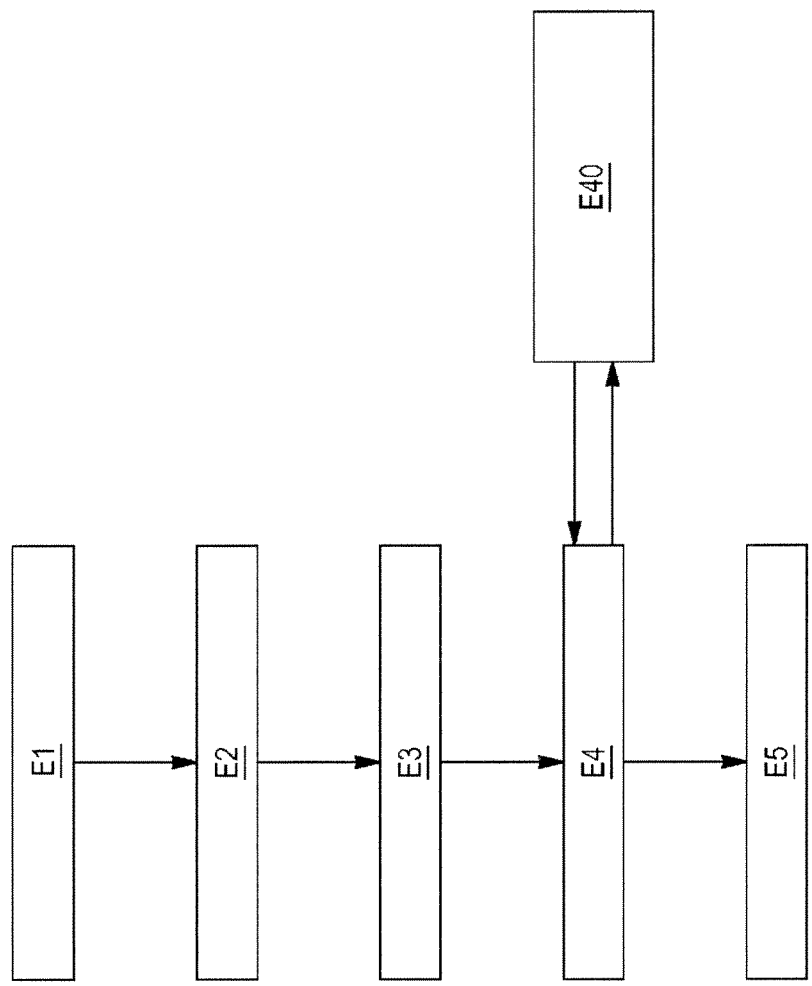
Figure 3A:
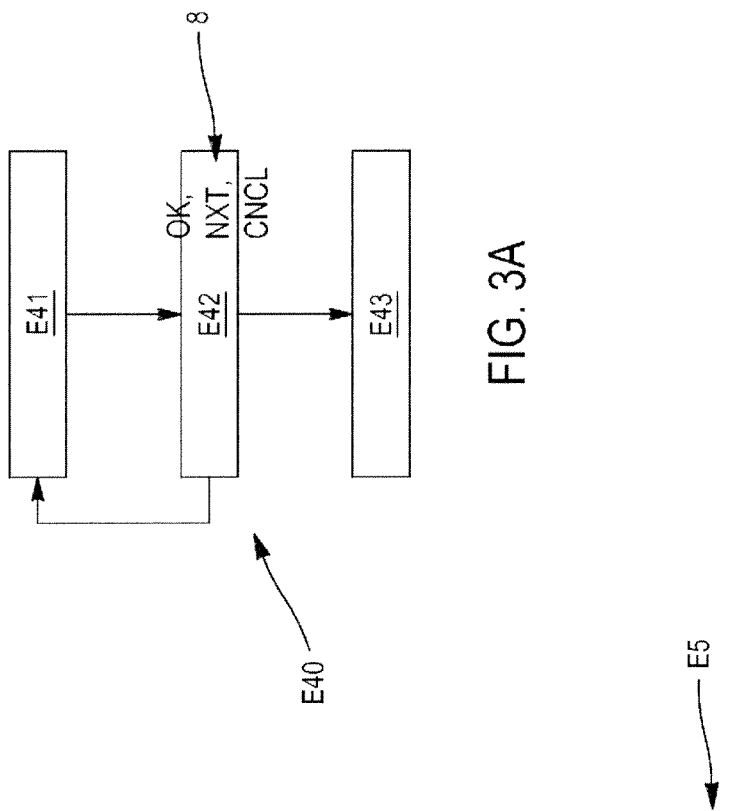
Figure 3B:
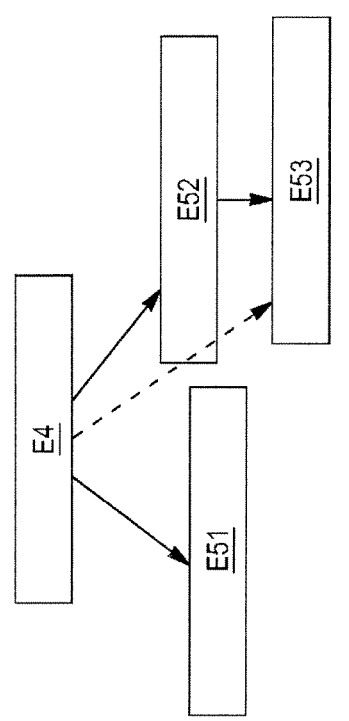

Other features, objects and advantages of the invention will become apparent from the following description, which is purely illustrative and non-limiting and which has to be read with reference to the appended drawings wherein:

FIG. 1 schematically illustrates a scanner 1 according to the invention;

FIG. 2 schematically illustrates the main steps of a method according to the invention; and FIGS. 3 illustrate more detailed views of certain steps of FIG. 2.

In the whole of the figures, similar elements bear identical numerical references.

DETAILED DESCRIPTION

FIGS. 2 and 3 schematically illustrate the main steps of a method according to the invention and the main components of a scanner 1 according to the invention.

General Principle

A method for processing a document 3 to be associated with at least one service Si, conventionally comprises a step according to which a scanner 1 scans document 3, during a step E1.

The scanning of the document 3 by the scanner 1 is known to one skilled in the art and is not described in more detail in the following of the present description.

Also, the scanner 1 includes a processor 6 including all the processing and memory storage means known per se for carrying out the steps of the method according to the invention.

The scanning step E1 allows digitization of document 3 in order to convert it into a computer file which may be processed.

Each service Si may for example be a service S1 for processing invoices, a service S2 for processing CVs, a service S3 for processing letters of complaints, a service S4 for processing order forms, etc.

The method then comprises a step E2 during which the processor 6 elaborates at least one structure $\Sigma j$ representative of document 3.

As this will be seen in more detail in an example in the following of the present description, the structure $\Sigma j$ representative of document 3 may for example correspond to a list recovering a number of occurrences of at least one word of the document, and/or to a graphical or morphic structure of the document, and/or to a structure of the colors of the document, and/or to a semantic structure of at least one expression of the document. Other structures may also be envisioned.

The method then comprises a step E3 during which the processor 6 determines for each service Si at least one similitude value $\sigma ij$ between the representative structure $\Sigma j$ of document 3 and a reference structure Rij of the same nature and representative of said service Si.

For this purpose, and as this will be seen in more detail in the following of the present description, the scanner 1 includes a memory 5 in which each reference structure Rij and the parameters for the calculation of each value $\sigma ij$ are stored.

In FIG. 1, the memory 5 is local and comprised in the scanner 1, but it is understood that the memory 5 may also be remote, for example on a telecommunications network and accessible to the processor 6 by means of conventional communications means 4.

The method then comprises a step E4 during which the processor 6 infers from the values $\sigma ij$ the service Si with which document 3 should be associated.

The method then comprises a step E5 during which the processor 6 processes the document 3 according to the thereby associated service Si. The processing operation comprises making the document available for the distant and automatic service operator.

Exemplary Application

A non-limiting exemplary application of the invention is given here.

After the step E1 for scanning the document 3, the processor 6 passes to step E2 during which the processor 6 develops at least one structure $\Sigma j$ representative of the document 3. For example:

$\Sigma 1$ is a list recovering the number of occurrences of each word of the document 3;

$\Sigma 2$ is a morphic structure of the document recovering at least one logotype optionally present in document 3;

$\Sigma 3$ is a graphical structure of the document recovering at least one graphic organization of the document 3;

$\Sigma 4$ is a semantic structure of the document 3; and $\Sigma 5$ is a structure of the colors of the document 3.

The document may for example be of the typed/printed or handwritten type.

In the case of the typed/printed type of document, character recognition methods (or Optical Character Recognition (OCR)) are well known to one skilled in the art and will not be taken up again in detail in the following of the present description.

In the case of the document of the handwritten type, it is also possible now to carry out word recognition as shown for example by the publication of the thesis "Reconnaissance d'écriture manuscrite par des techniques markoviennes: une approche bidimensionnelle et generique" (Recognition of handwriting by Markov techniques: a two dimensional and generic approach) of Sylvain Chevalier presented on Dec. 3, 2004. This is then referred to as Intelligent Character Recognition or smart character recognition.

Logotype recognition does not either pose any difficulty as shown in the publication of 1997 "Logo Recognition by Recursive Neural Neworks" of E. Francesconi, P. Frasconi, M. Gori, S. Marinai, J. Q. Sheng, G. Soda and A. Sperduti, from the universities of Florence, Sienna and Pisa in Italy (http://www.dis.unifi.it/~paclo/ps/GREC-97-logo.pdf).

Finally the recognition of a semantic structure or of the colors is also well known to one skilled in the art, as shown for example by the publications.

UCREL Semantic Analysis System (USAS) (http://ucrel.lancs.ac.uk/usas/), and

"Traitement automatique de texts: techniques linguistiques" (Automatic processing of texts: linguistic techniques) of Cecile Fabre published on Feb. 10, 2001 in the "Techniques de l'ingénieur" (reference H7258).

An example of graphical structure recognition does not either pose any difficulty, as shown by the publication "Analyse et reconnaissance d'images de documents" (Analysis and recognition of images from documents) of Rolf Ingold, published on Aug. 10, 2002 in the "Techniques de l'ingénieur" (reference H7020), or "Reconnaissance de l'imprimé" (Printed Form Recognition) of Philippe Lefevre, published on May 10, 1999 in the "Techniques de l'ingénieur" under reference H1348.

The processor 6 then passes to step E3 during which the processor 6 determines for each service Si at least one similitude value $\sigma ij$ between the representative structure $\Sigma j$ of document 3 and a reference structure Rij of the same nature and representative of said service Si.

For this purpose, the memory 5 includes a database 7 in which are stored reference structures Rij, and for example notably:

R11 is a list of words specific to an invoice, such as for example "Euros", "amount", "Taxes excluded", "VAT", "client", etc.:

R12 is a morphic structure taking up again at least one particular logo of certain invoices, for example a letterhead of a preferential supplier;

R21 is a list of words specific to a CV, such as for example "school", "training period", "experience", "education", "job", etc.;

R23 is a graphic structure taking up again a specific organization of a CV, such as a table with several lines and columns;

R34 is a semantic structure specific to a complaint letter such as for example the semantic connection of the words "object", "complaint", "product", "date", "purchase"; and R45 is a structure of the specific colors of an order form, for example from a preferential customer.

The processor 6 determines a similitude value σ11, σ12, σ21, σ23, σ34, and σ45, respectively between the structures Σ1, Σ2, Σ1, Σ3, Σ4 and Σ5 on the one hand and the structures R11, R12, R21, R23, R34 and R45 on the other hand.

For a structure forming a list of words k, the processor for example uses the formula:

$$\sigma ij = \sum_{k \in Rij} \lambda_k \cdot \delta_{\Sigma j}(k) \qquad (EQ\ 1)$$

wherein $\delta_{\Sigma j}(k)$ has the value
  0 if the word k of the list Rij is not in the list Σj, and
  1 if the word k of the list Rij is in the list Σj, and
wherein $\lambda_k$ is a weighting coefficient with which more or less significance may be given to the word k.

The parameters $\delta_{\Sigma j}(k)$ and $\lambda_k$ are also stored in the database 7. It is understood that other examples for calculating similitude σij are possible for lists of words.

It is also understood that for a morphic structure, a graphic structure, a semantic structure or a color structure, the processor 6 may also use for example the formula (EQ1) according to the presence or not of the logo, of the specific organisation, of similar expressions or colors in the structures of the document 3. Also in this case. $\lambda_k$ is a weighting coefficient by which more or less significance may be given to the relevant element k.

It is understood that other examples for calculating similitude σij are possible for a morphic structure, a graphic structure, a semantic structure or a color structure.

The processor 6 then passes to step E4 during which the processor 6 infers from these values σij the service Si with which document 3 should be associated.

The index I of the service SI to be associated with document 3 is such that:

$$\sigma_{Ij} = \max_i (\sigma ij).$$

Thus, in our example, if one has

σ21 <σ11 the list Σ1 comprises more words in common with list R11 than with list R21, and document 3 is therefore closer to an invoice than to a CV. The associated service is therefore the service S1 for processing invoices.

The processor 6 then passes to step E5 during which the document 3 is processed depending on the thereby associated service Si. The processing E5 to be carried out on document 3 and how the data of document 3 are encoded, or even encrypted, actually depends on the operator. The processing operation first of all consists of giving access to the document to an automatic and remote service operator carrying out processing of the document.

Access E5 to the document for the operator comprises, according to a first application, the sending E51 of the document 3 to the operator providing the service S1.

The sending E51 is conventionally carried out by communications means 4 of the scanner 1, known per se by one skilled in the art. They are therefore not described in detail in the following of the present description.

The service operator then carries out, in its location and on proprietary means, the required processing on the document 3 in order to produce the service corresponding to its job. These proprietary means may optionally be very powerful computer means.

The service provided for example by an invoice dematerialization operator is to extract the name of the supplier, references thereof, the amount of the invoice, the date of the invoice, the deadline for payment, the detail of the pieces of information making up the different items of the invoice (unit price, amounts).

The service operator may further for example make sure that the extracted supplier reference corresponds to an existing supplier reference for the relevant client, it may be ensured that the extracted amounts correspond to amounts which are usually processed. This information and its validity are as much elements which help the operator to establish the relevance of the performed dematerialization.

This relevance of the performed dematerialization is a second level, a so-called "application level" for checking the suggested classification.

In order to have a more complete view of the services provided by an operator, it is possible to refer to publications such as the accounting journal, RF Comptable No. 319 of July 2005, or to service tenders proposed by companies such as SERES (dematerialization of incoming invoices, notably).

According to a second possible application of the invention, the access E5 comprises the execution E53 of processing instructions stored in the memory 5 of the scanner 1, so that each operator may integrate the operator's own specificities into the scanner 1.

For this purpose, the memory 5 includes a memory space 9 dedicated to the storage of processing instructions for the associated service Si. The processing required on the document for producing the service is therefore locally carried out on the scanner 1.

The space 9 is advantageously compartmentalized so that each operator may have the operator's own memory space and keep control of the operator's processing.

According to an advantageous alternative of this second application, the processor 6 uploads during a step E52 the processing instructions to the memory 5 of the scanner 1, and more specifically to the space 9, before the execution E53 of said instructions. This allows the necessary reduction in the memory space 9, and gives the possibility of making sure that the processor 6 always uses the instructions, directly updated by the operators.

Thus, in a document 3 of several pages for example, the association of the service is achieved on the first page which is locally stored in the memory 5 and processed, the suitable processing instructions may then be uploaded in hidden time during the scanning of the second page for example.

The upload E52 conventionally takes place by using communications means 4.

Advantageously, the inference step E4 comprises learning, referenced by E40 on the figures, in which the processor 6 proposes, during a step E41 a service to be associated with document 3, on the basis of calculated similitudes σij.

For this purpose, the scanner 1 includes display means 2 conventionally including a liquid crystal screen, for example allowing display of the proposal of step E41, by the name of the associated service Si.

In our example, it may for example happen that

σ11<σ31 and that the processor 6 associates the document 3 with the service 3.

The learning process E40 further includes a step E42 during which a control 8 sends an instruction for validating the proposal E41, for example referenced by OK, or an instruction invalidating the proposal E41, for example referenced by NXT or CNCL.

For this purpose, the control 8 may include an itnerface, for example a push button and/or a tactile option, associated with the means 2.

If after a study of document 3, the human user estimates that the proposal E41 of the processor is correct, he then actuates the control 8 for sending E42 a validation instruction of the OK type.

If on the contrary, the user estimates that the proposal E41 from the processor is not correct, he/she then actuates the control 8 for sending E42 a non-validation instruction.

The non-validation instruction may be of two types.

The first type is referenced by NXT, and may for example be an instruction requiring that the processor 6 propose the service which has the next highest similitude, and so forth until a correct proposal which generates the sending of a validation instruction, as explained above.

The second type is referenced by CNCL, and may for example be an instruction requiring that the processor 6 cancel the service proposals, the association of the service with the document 3 then being for example carried out manually by the user.

The processor 6 takes into account, during a step E43, said instruction in subsequent service proposals E41.

For this purpose, the database 7 includes a correspondence table between the values φi and the similitudes σij in order to either retrieve validations or not for each proposal E41 of the service Si.

In the case when the user accepts by an OK instruction, the proposal of the service Si, the processor 6 then carries out a mathematical iteration for example during step E43 so that:

$$\Phi i \leftarrow f(\Phi i)$$

wherein a finite value φi in the table is replaced with a new finite value φi by means of f, a function such that:

$$\forall x, f(x) \geq x$$

The function f may for example be an incremental function such as:

$$f(x) = x+1$$

In the case when the user does not accept the proposal of the service Si by a NXT instruction, the processor 6 proposes the service having the next largest similitude.

However, for the service Si proposed and invalidated previously, the processor 6 then carries out for example during step E43:

$$\Phi i \leftarrow g(\Phi i)$$

wherein a finite value φi in the table is replaced with a new finite value φi by means of g, a function such as:

$$\forall x, g(x) \leq x$$

The function g may for example be a decremental function such as:

$$g(x) = x-1$$

In the case when the user does not accept the proposal of the service Si by a CNCL instruction, the processor 6 does not modify the correspondence table.

It is then understood that the processor 6 may advantageously promote in subsequent E41 proposals, services having previously led to the sending E42 of an OK validation instruction by the control 8.

For this purpose, equation (EQ1) is modified into (EQ2) such that:

$$\sigma ij = \Phi i \cdot \sum_{k \in Rij} \lambda_k \cdot \delta_{\Sigma j}(k) \qquad (EQ\ 2)$$

The instruction of validation or not may, also advantageously as an addition to the instructions sent by the human operator, be sent by the automatic and remote service operator, once it has access to document 3. The operator is actually often equipped with powerful analysis equipment, and may better detect whether the document just received corresponds or does not correspond to the service thereof. The operator may therefore warn the scanner 1 on the quality of the proposal E41. The control 8 is in this case associated with communications means.

An example of the main steps carried out by the processor 6 and notably the steps of a learning process carried out by the processor 6 are developed hereafter.

```
# The learning process uses an input parameter,
# i.e. a text file containing the result of a character recognition
# processing operation #(OCR) on the original document.
# Character recognition is known to one skilled in the art.
# Both following imported functions (pickle and sys) are standard
# functions of the programming language 'Python', and they are
# therefore known to one skilled in the art.
import pickle
import sys
# Extract of the list of words contained in the document
structure = set (open (sys.argv[1], "r").read( ).lower( ).split( ))
# Loading the knowledge base, stored in base 7.
try :
services = pickle.load (file ("services.db", "rb"))
except:
# In the case of an error, reset with default values
     services = {
         "Invoice": [ {    "invoice":         90,
                           "Statement":        5,
                           "Vat":            100,
                           "duty-free":       80,
                           "Money":           10,
                           "total":           90 },
                      50 ] ,
         "letter": [ {    "dear":            80,
                           "Sir":             50,
                           "Madam":           50,
                           "Regards" :        33,
                           "Sincerely":       33,
                           "Faithfully":      33 },
                      50 ] ,
         "Slip":    [ { "Delivery":   75,
                        "Date":       10,
                        "Value":      80,
                        "Supplier":   50,
                        "Référence":  70,
                        "heading":    60 },
                      50 ]
#Calculate the score of each service
     scores = [ ]
     for name, (ref, phi) in services.items( ):
         score = 0
         for word, lamb in ref.items( ): if word in structure:
              score += lamb scores.append ((score * phi, name))
#SEARCH AND LEARNING PROCESS: Browse through the list in
#decreasing score order until the user confirms
     ok = False
     for _, service in reversed (sorted (scores)):
         print "Check that the docuent relates to service '%s'" %
```

```
service
response = raw_input ("Enter O to confirm, N to reject:
").lower( )
    if response == "o":
        print "You have confirmed that the document relates to
the service '%s'" % service
        # Update phi for the current service
        services[service][1] = min (100, services[service][1]+1)
        # Other possible version:
        # services[service][1] = (services[service][1] + 100) // 2
        ok = True
        break else :
        # Update phi for the current service
        # current services[service][1] = max (1,
        services[service][1]-1)
        # Other possible version:
        # services[service][1] = (services[service][1] +1) // 2 if
not ok:
    print "Document does not relate to any known service!"
# SAVE LEARNING PROCESS: Save the knowledge base
# in base 7
print "Values of Phi:", [ "%s: %d" % (service, phi) for (service,
(_, phi)) in services.items( ) ]
pickle.dump (services, file ("services.db", "wb"))
raw_input ("Press on Enter to continue")
```

The implementation example proposed above assumes for a better understanding of the method that the learning process is carried out under the guidance of a human user in order to accept or reject the proposals made by the scanner.

Of course, the automated processing capabilities of the remote service operator, as well as its specialization relatively to the provided service, allow the service operator, as this has already been seen, to estimate the relevance of the document received and therefore allow it to provide a relevant validation (or invalidation) instruction, with less risks of error than a human validation.

For example, in the case of a service operator ensuring dematerialization of invoices, if the automatic extraction of information allows it to find relevant information (identification of an already known supplier, of usual amounts, of a global amount which is actually the sum of the amount of the different items), it may send a validation instruction; on the contrary if such elements are not extracted, it may inform the scanner that the wrong service was proposed.

The sending of the instruction by the operator may either be combined or not with the sending of the instruction by the human user.

Of course, any other learning process may also be applied.

Preferentially, the processor 6 compares the similitude value σij with a confidence threshold t. The processor 6 considers that when the obtained value σij is greater than the threshold t, such as σij>t the confidence in the recognition of the type of document is sufficient so as to not await a validation instruction or not on the behalf of the user or of the operator. The learning step E40 is therefore interrupted.

The invention claimed is:

1. A method for classifying a document to be associated with at least one service, comprising
    a step according to which a scanner including a processor scans document, and the steps according to which the processor:
    develops at least one structure representative of the document;
    compares the representative structure of the document with at least one reference structure of the same nature and representative of said service;
    determines for each service at least one similitude value between the representative structure of the document and the reference structure of the same nature and representative of said service, and
    infers from said similitude value the service with which the document is to be associated, and thereby forms locally a proposal for classifying it,
    wherein the inference comprises a learning process according to which:
    a human user and/or a thereby associated remote and automatic service operator send back to the processor, via a control, an instruction for validation or invalidation of the proposal locally carried out by the processor, and
    the processor takes into account said instruction in subsequent service proposals, and promotes in subsequent proposals services having led to the sending of a validation instruction by the control.

2. The method according to claim 1, wherein the processor compares the similitude value to a confidence threshold.

3. The method according to claim 1, wherein the processor gives access to the document to the thereby associated, distant and automatic service operator depending on the service.

4. The method according to claim 3, wherein the access to the document comprises the sending of the document to the operator providing the service, through communication means of the scanner.

5. The method according to claim 3, wherein the access to the document comprises the execution of processing instructions stored locally in a memory of the scanner.

6. The method according to claim 5, wherein the processor uploads the processing instructions towards the memory of the scanner.

7. The method according to claim 1, wherein the structure representative of document corresponds:
    to a list taking up again a number of occurrences of at least one word of the document, and/or to a graphic or morphic structure of the document, and/or to a structure of the colors of the document, and/or to a semantic structure of at least one expression of the document.

8. A scanner for a document and for selecting services to be associated with the document comprising a processor,
    said processor being adapted for:
    developing at least one structure representative of document, determining for each service at least one similitude value between the representative structure of the document and a reference structure of the same nature and representative of said service, and locally inferring from this similitude value the service with which document is to be associated,
    wherein the processor is adapted for a learning process during the inference, and is thus suitable for receiving, from a human operator and/or from a thereby associated, distant and automatic service operator, an instruction for validating or invalidating the proposal locally carried out by the processor, via a control and for taking said instruction into account in subsequent service proposals by the processor, and is thus adapted for promoting in subsequent proposals of the services having led to the sending of a validation instruction by the control.

9. The scanner according to claim 8, further comprising remote communication means with a server and/or with the service operator.

10. The method according to claim 2, wherein the processor gives access to the document to the thereby associated, distant and automatic service operator depending on the service.

11. The method according to claim 2, wherein the structure representative of document corresponds:
to a list taking up again a number of occurrences of at least one word of the document, and/or to a graphic or morphic structure of the document, and/or to a structure of the colors of the document, and/or to a semantic structure of at least one expression of the document.

12. The method according to claim 3, wherein the structure representative of document corresponds:
to a list taking up again a number of occurrences of at least one word of the document, and/or to a graphic or morphic structure of the document, and/or to a structure of the colors of the document, and/or to a semantic structure of at least one expression of the document.

13. The method according to claim 10, wherein the structure representative of document corresponds:
to a list taking up again a number of occurrences of at least one word of the document, and/or to a graphic or morphic structure of the document, and/or to a structure of the colors of the document, and/or to a semantic structure of at least one expression of the document.

14. The method according to claim 4, wherein the structure representative of document corresponds:
to a list taking up again a number of occurrences of at least one word of the document, and/or to a graphic or morphic structure of the document, and/or to a structure of the colors of the document, and/or to a semantic structure of at least one expression of the document.

15. The method according to claim 5, wherein the structure representative of document corresponds:
to a list taking up again a number of occurrences of at least one word of the document, and/or to a graphic or morphic structure of the document, and/or to a structure of the colors of the document, and/or to a semantic structure of at least one expression of the document.

16. The method according to claim 6, wherein the structure representative of document corresponds:
to a list taking up again a number of occurrences of at least one word of the document, and/or to a graphic or morphic structure of the document, and/or to a structure of the colors of the document, and/or to a semantic structure of at least one expression of the document.

* * * * *